United States Patent
Aytekin et al.

(10) Patent No.: US 11,915,144 B2
(45) Date of Patent: Feb. 27, 2024

(54) APPARATUS, A METHOD AND A COMPUTER PROGRAM FOR RUNNING A NEURAL NETWORK

(71) Applicant: Nokia Technologies Oy, Espoo (FI)

(72) Inventors: Caglar Aytekin, Tampere (FI); Miska Hannuksela, Tampere (FI); Francesco Cricrì, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/281,945

(22) PCT Filed: Sep. 20, 2019

(86) PCT No.: PCT/FI2019/050674
§ 371 (c)(1),
(2) Date: Mar. 31, 2021

(87) PCT Pub. No.: WO2020/070376
PCT Pub. Date: Apr. 9, 2020

(65) Prior Publication Data
US 2022/0007084 A1 Jan. 6, 2022

(30) Foreign Application Priority Data
Oct. 2, 2018 (FI) .................................... 20185824

(51) Int. Cl.
| | |
|---|---|
| *H04N 21/81* | (2011.01) |
| *G06N 3/084* | (2023.01) |
| *G06N 3/08* | (2023.01) |
| *H04N 21/845* | (2011.01) |
| *H04L 65/70* | (2022.01) |
| *H04L 65/75* | (2022.01) |

(Continued)

(52) U.S. Cl.
CPC .............. *G06N 3/084* (2013.01); *G06N 3/08* (2013.01); *G06V 10/70* (2022.01); *G06V 10/82* (2022.01); *H04L 65/70* (2022.05); *H04L 65/75* (2022.05); *H04N 21/8193* (2013.01); *H04N 21/845* (2013.01)

(58) Field of Classification Search
CPC .... H04N 21/845; H04N 21/8193; G06N 3/08; H04L 65/601; H04L 65/607
See application file for complete search history.

(56) References Cited

U.S. PATENT DOCUMENTS

| | | | |
|---|---|---|---|
| 10,652,565 B1 * | 5/2020 | Zhang | .................. H04N 19/463 |
| 2016/0283864 A1 | 9/2016 | Towal | .................. 99/5 |

(Continued)

OTHER PUBLICATIONS

Choi et al., "High Efficiency Compression for Object Detection" arXiv, Feb. 16, 2018, 5 pages.

(Continued)

*Primary Examiner* — Mulugeta Mengesha
(74) *Attorney, Agent, or Firm* — Joseph C. Drish; Harrington & Smith

(57) ABSTRACT

A method comprising: obtaining (400), in a first apparatus (500), media content, encoding (402), in a neural data compression network of the first apparatus (500), the media content wherein one or more parameters of the neural data compression network are determined based on a type of at least one analysis task to be performed on the media content; and transmitting (404) the encoded media content to a second apparatus (502).

28 Claims, 5 Drawing Sheets

(51) Int. Cl.
*G06V 10/70* (2022.01)
*G06V 10/82* (2022.01)

(56) References Cited

U.S. PATENT DOCUMENTS

| | | | | |
|---|---|---|---|---|
| 2018/0174047 | A1* | 6/2018 | Bourdev | G06N 3/08 |
| 2018/0176578 | A1* | 6/2018 | Rippel | G06V 30/19167 |
| 2018/0332301 | A1 | 11/2018 | Tian et al. | |
| 2019/0132741 | A1* | 5/2019 | Stone | G06N 20/20 |
| 2019/0311202 | A1* | 10/2019 | Lee | G06K 9/627 |
| 2019/0392300 | A1* | 12/2019 | Weber | G06N 3/04 |

OTHER PUBLICATIONS

Galteri et al., "Video Compression for Object Detection Algorithms", 24th International Conference on Pattern Recognition (ICPR), Aug. 20-24, 2018, 6 pages.

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Parameter Values for Ultra-High Definition Television Systems for Production And International Programme Exchange", Recommendation ITU-R BT.2020-2, Oct. 2015, 8 pages.

"Parameter Values for the HDTV Standards for Production and International Programme Exchange", Recommendation ITU-R BT.709-6, Jun. 2015, 19 pages.

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 15: Advanced Video Coding (AVC) File Format", ISO/IEC 14496-15, First edition, Apr. 15, 2004, 29 pages.

"Information Technology—Generic Coding of Moving Pictures and Associated audio Information: Systems", Series H: Audiovisual And Multimedia Systems, Infrastructure of audiovisual services—Transmission multiplexing and synchronization, Recommendation ITU-T H.222.0, Mar. 2017, 291 pages.

Office action received for corresponding Finnish Patent Application No. 20185824, dated Mar. 19, 2019, 11 pages.

Shao et al., "Deep Beacon: Image Storage and Broadcast over BLE Using Variational Autoencoder Generative Adversarial Network", 14th International Conference on Distributed Computing in Sensor Systems (DCOSS), Jun. 18-20, 2018, pp. 147-154.

Mohammadi et al., "Semisupervised Deep Reinforcement Learning in Support of IoT and Smart City Services", IEEE Internet of Things Journal, vol. 5, No. 2, Apr. 2018, pp. 624-635.

Kiasari et al., "Joint Moment Matching Autoencoders", Neural Networks, vol. 106, Oct. 2018, pp. 185-193.

Kiasari et al., "Generative Moment Matching Autoencoder with Perceptual Loss", International Conference on Neural Information Processing, Lecture Notes in Computer Science, vol. 10635, 2017, pp. 226-234.

Kuga et al., "Multi-task Learning Using Multi-modal Encoder-Decoder Networks with Shared Skip Connections", IEEE International Conference on Computer Vision Workshops (ICCVW), Oct. 22-29, 2017, pp. 403-411.

Ghifary et al., "Domain Generalization for Object Recognition with Multi-task Autoencoders", IEEE International Conference on Computer Vision (ICCV), Dec. 7-13, 2015, pp. 2551-2559.

Zhang et al., "Deep Learning in Mobile and Wireless Networking: A Survey", arXiv, Sep. 17, 2018, pp. 1-53.

International Search Report and Written Opinion received for corresponding Patent Cooperation Treaty Application No. PCT/FI2019/050674, dated Dec. 23, 2019, 18 pages.

Minervini et al., "Classification-Aware Distortion Metric for HEVC Intra Coding", Visual Communications and Image Processing (VCIP), Dec. 13-16, 2015, 4 pages.

"Use cases and requirements for compressed representation of neural networks", ISO/IEC JTC1/SC29/WG11/N17924, Oct. 2018, 37 pages.

* cited by examiner

APPARATUS, A METHOD AND A COMPUTER PROGRAM FOR RUNNING A NEURAL NETWORK

RELATED APPLICATION

This application claims priority to PCT Application No. PCT/FI2019/050674, filed on Sep. 20, 2019, which claims priority to Finnish Application No. 20185824, filed on Oct. 2, 2018, each of which is incorporated herein by reference in its entirety.

TECHNICAL FIELD

The present invention relates to an apparatus, a method and a computer program for running a neural network.

BACKGROUND

Neural networks are used more and more in various types of devices, from smartphones to self-driving cars. Many small devices are typically very constrained in terms of memory, bandwidth and computation capacity. On the other hand, many small devices are configured to run applications, which could benefit from running the application or part of it as NN-based algorithms.

Lately, neural networks have been used for compressing and de-compressing data, such as video/images. Reducing the distortion in video/image compression is often intended to increase human perceptual quality. However, there is a rising number of machines utilizing machine learning that analyze data and take decisions independently from humans. Such analysis include e.g. object detection, scene classification, semantic segmentation, video event detection, anomaly detection, and pedestrian tracking.

Thus, there may arise scenarios, where the video/image encoding could be tuned differently than from human perceptual quality point of view. For example, a decoded video/image bitstream resulting from the encoded video/image bitstream may be analyzed through computationally-heavy processes carried out by large and deep neural networks. As another example, an analysis of the decoded video/image bitstream may result into alerts about anomalies or the presence of certain objects or events in the video, and a human observer may want to observe the alerted portions of the decoded video/image.

Accordingly, there is a need for an arrangement where the media content encoding process could be optimized for other distortion metric than conventionally used metrics aiming at minimizing the human-observed media content quality degradation.

SUMMARY

Now in order to at least alleviate the above problems, an improved method for training and running a neural network is introduced herein.

A method according to a first aspect comprises obtaining, in a first apparatus, media content; encoding, in a neural data compression network of the first apparatus, the media content wherein one or more parameters of the neural data compression network are determined based on a type of at least one analysis task to be performed on the media content; and transmitting the encoded media content to a second apparatus.

According to an embodiment, the method further comprises indicating, by the first apparatus, the at least one analysis task to be performed by a neural task network of the second apparatus.

According to an embodiment, the method further comprises requesting, by the first apparatus, the output of the at least one analysis task to be sent back to the first apparatus.

A method according to a second aspect comprises receiving media content encoded by a second apparatus with a neural data compression network; decoding, in a neural data decompression network of a first apparatus, the encoded media content wherein one or more parameters of the neural data decompression network are determined based on a type of at least one analysis task to be performed on the media content; performing, in a neural task network of the first apparatus trained to analyze the media content, at least one analysis task for the media content; and obtaining an output of the at least one analysis task.

According to an embodiment, the method further comprises learning the neural task network offline prior to deployment of the neural data compression network and the neural data decompressor network.

According to an embodiment, the offline learning comprises maximizing an accuracy of the related task and minimizing a bitrate of the encoded media content.

According to an embodiment, the method further comprises fine-tuning the neural task network from a pre-trained model by differentiating a loss with respect to weights of the neural task network.

According to an embodiment, the method further comprises fine-tuning the neural data compression network and/or the neural data decompression network.

According to an embodiment, the method further comprises learning the neural data compression network and/or neural data decompression network in respect of a plurality of neural task networks.

A third aspect relates to a neural network system comprising a first apparatus and a second apparatus, the first apparatus comprising means for obtaining media content; a neural encoder for encoding the media content; means for transmitting the encoded media content to the second apparatus; and the second apparatus comprising a neural decoder for decoding the encoded media content; a neural task network for performing at least one analysis task for the media content; and means for obtaining an output of the at least one analysis task.

An apparatus according to a fourth aspect comprises means for obtaining media content; a neural data compression network for encoding the media content, wherein one or more parameters of the neural data compression network are determined based on a type of at least one analysis task to be performed on the media content; and means for transmitting the encoded media content to a second apparatus.

An apparatus according to a fifth aspect comprises means for receiving media content encoded by a second apparatus with a neural data compression network; a neural data decompression network for decoding the encoded media content, wherein one or more parameters of the neural data compression network are determined based on at least one analysis task to be performed on the received media content; a neural task network for performing the at least one analysis task for the media content; and means for obtaining an output of the at least one analysis task.

Apparatuses may comprise at least one processor and at least one memory, said at least one memory stored with code thereon, the at least one memory and the computer program code configured to, with the at least one processor, cause the apparatus to perform the method.

According to a further aspect, there is provided a computer readable non-transitory storage medium stored with code thereon for use by an apparatus, which when executed by a processor, causes the apparatus to perform the method.

The apparatuses and the computer readable storage mediums stored with code thereon, as described above, are thus arranged to carry out the above methods and one or more of the embodiments related thereto.

Further aspects relate to apparatuses comprising means for performing the above methods and one or more of the embodiments related thereto.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

In the following, several embodiments will be described in the context of encoding and decoding visual data, such as video frames. It is to be noted, however, the embodiments are not limited to processing of visual data, but the different embodiments have applications in any environment where any media content can be streamed and compressed. Thus, applications including but not limited to, for example, streaming of speech or other audio data can benefit from the use of the embodiments.

Figure 1:
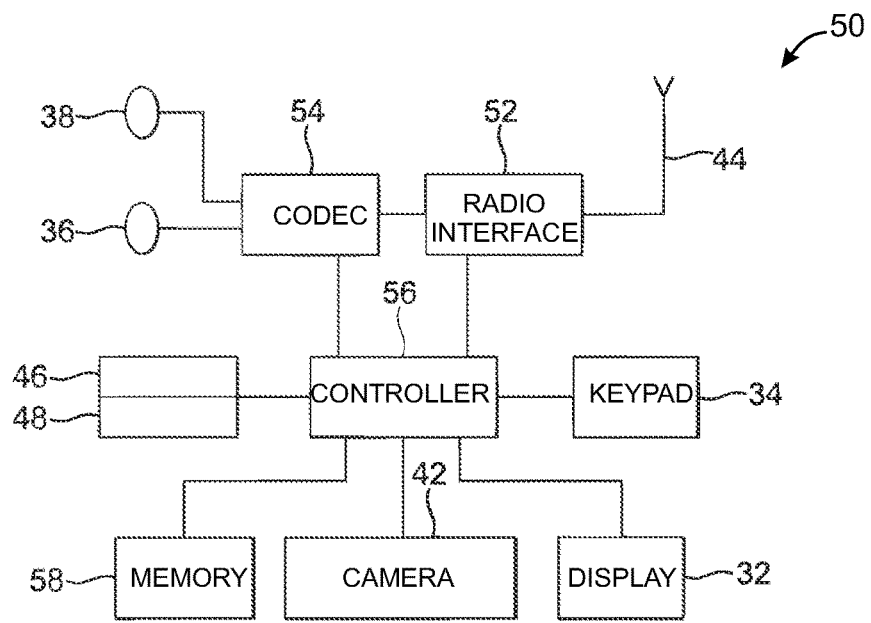
FIG. 1 shows schematically an electronic device employing embodiments of the invention.
Figure 2:
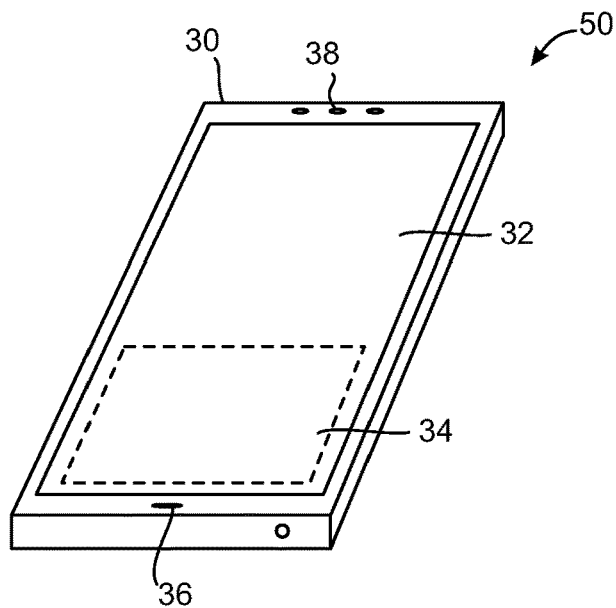
FIG. 2 shows schematically a user equipment suitable for employing embodiments of the invention.

The following describes in further detail suitable apparatus and possible mechanisms for running a neural network according to embodiments. In this regard reference is first made to FIGS. 1 and 2, where FIG. 1 shows an example block diagram of an apparatus 50. The apparatus may be an Internet of Things (IoT) apparatus configured to perform various functions, such as for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIGS. 1 and 2 will be explained next.

The electronic device 50 may for example be a mobile terminal or user equipment of a wireless communication system, a sensor device, a tag, or other lower power device. However, it would be appreciated that embodiments of the invention may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
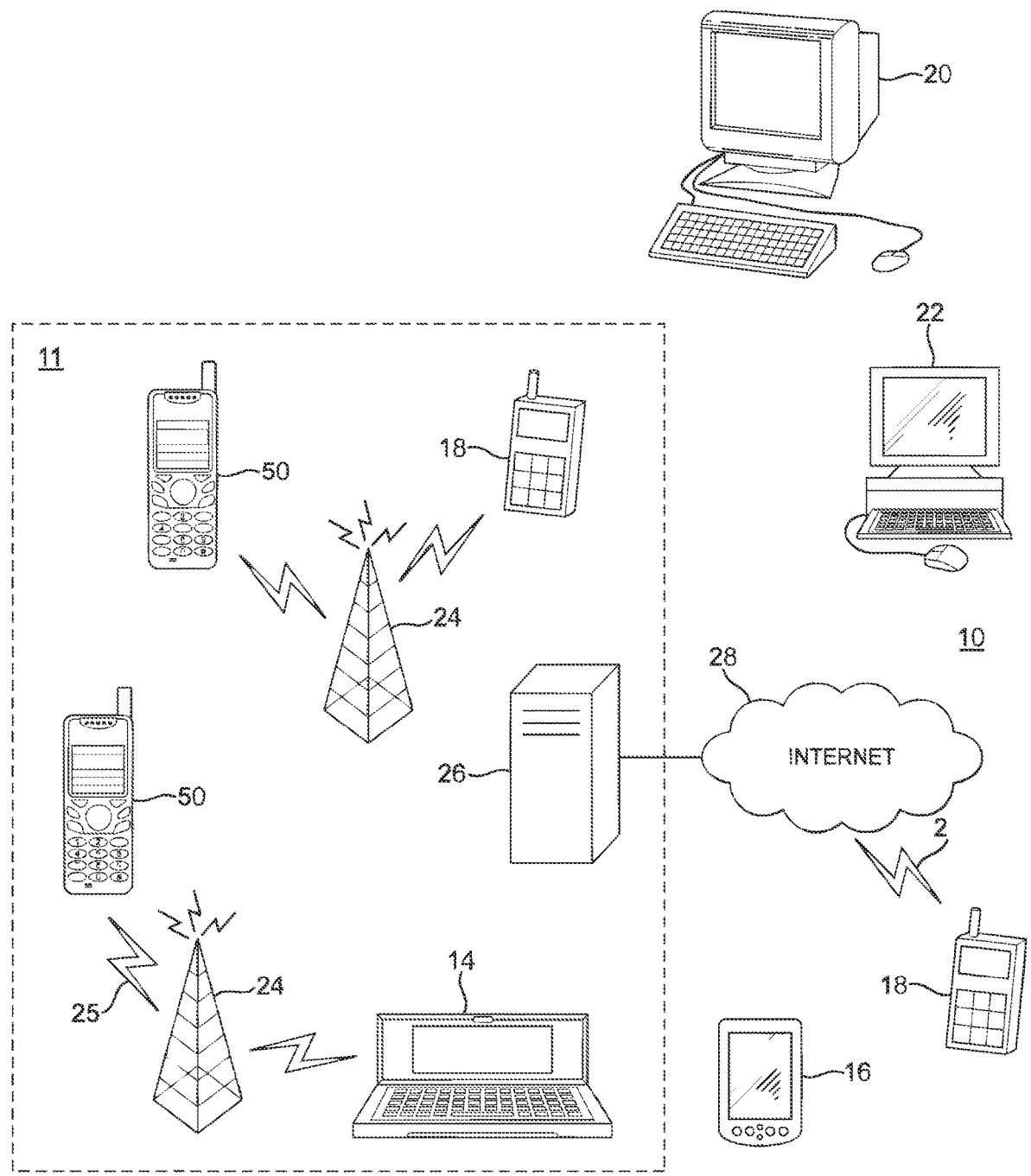
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, 4G, 5G network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and will enable many fields of embedded systems, such as wireless sensor networks, control systems, home/building automation, etc. to be included the Internet of Things (IoT). In order to utilize Internet IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

The elementary unit for the input to an encoder and the output of an decoder, respectively, is typically a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in or along a coded bitstream. A component may be defined as an array or single sample from one of the three sample arrays (luma and two chroma) or the array or a single sample of the array that compose a picture in monochrome format.

In many codecs, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In some codecs, it may be possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

A coded picture is a coded representation of a picture.

A bitstream may be defined as a sequence of bits that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated e.g. in the first bitstream.

Recently, the development of various artificial neural network (NN) techniques, especially the ones related to deep learning, has enabled to learn algorithms for several tasks from the raw data, which algorithms may outperform algorithms which have been developed for many years using traditional (non-learning based) methods.

Artificial neural networks, or simply neural networks, are parametric computation graphs consisting of units and connections. The units may be arranged in successive layers, and in some neural network architectures only units in adjacent layers are connected. Each connection has an associated parameter or weight, which defines the strength of the connection. The weight gets multiplied by the incoming signal in that connection. In fully-connected layers of a feedforward neural network, each unit in a layer is connected to each unit in the following layer. So, the signal which is output by a certain unit gets multiplied by the connections connecting that unit to other units in the following layer. Each of the latter units then may perform a simple operation such as a sum of the incoming signals.

Apart from fully-connected layers, there are different types of layers, such as but not limited to convolutional layers, non-linear activation layers, batch-normalization layers, and pooling layers.

The input layer receives the input data, such as images, and the output layer is task-specific and outputs an estimate of the desired data, for example a vector whose values represent a class distribution in the case of image classification. The "quality" of the neural network's output is evaluated by comparing it to ground-truth output data. The comparison may include a loss or cost function, run on the neural network's output and the ground-truth data. This comparison would then provide a "loss" or "cost" value.

The weights of the connections represent the biggest part of the learnable parameters of a neural network. Hereinafter, the terms "model" and "neural network" are used interchangeably, as well as the weights of neural networks are sometimes referred to as learnable parameters or simply as parameters.

The parameters are learned by means of a training algorithm, where the goal is to minimize the loss value on a training dataset and on a held-out validation dataset. In order to minimize such value, the network is run on a training dataset, a loss value is computed for the whole training dataset or for part of it, and the learnable parameters are modified in order to minimize the loss value on the training dataset. However, the performance of the training is evaluated on the held-out validation dataset. The training dataset is regarded as a representative sample of the whole data. One popular learning approach is based on iterative local methods, where the loss on the training dataset is minimized by following the negative gradient direction. Here, the gradient is understood to be the gradient of the loss with respect to the learnable parameters of the neural network. The loss may be represented by the reconstructed prediction error. Computing the gradient on the whole training dataset may be computationally too heavy, thus learning is performed in sub-steps, where at each step a mini-batch of data is sampled and gradients are computed from the mini-batch. This is referred to as stochastic gradient descent. The gradients are usually computed by back-propagation algorithm, where errors are propagated from the output layer to the input layer, by using the chain rule for differentiation. If the loss function or some operations performed by the neural network are not differentiable, it is still possible to estimate the gradient of the loss by using policy gradient methods, such as those used in reinforcement learning. The computed gradients are then used by one of the available optimization routines (such as stochastic gradient descent, Adam, RMSprop, etc.), to compute a weight update, which is then applied to update the weights of the network. After a full pass over the training dataset, the process is repeated several times until a convergence criterion is met, usually a generalization criterion. A generalization criterion may be derived from the loss value on the held-out validation dataset, for example by stopping the training when the loss value on the held-out validation dataset is less than a certain threshold. The gradients of the loss, i.e., the gradients of the reconstructed prediction error with respect to the weights of the neural network, may be referred to as the training signal.

Training a neural network is an optimization process, but as a difference to a typical optimization where the only goal is to minimize a function, the goal of the optimization or training process in machine learning is to make the model to learn the properties of the data distribution. In other words, the goal is to learn to generalize to previously unseen data, i.e., data which was not used for training the model. This is usually referred to as generalization. In practice, data is usually split into two (or more) sets, the training set and the validation set. The training set is used for training the network, i.e., to modify its learnable parameters to minimize the loss. The validation set is used for checking the performance of the network on data which was not used to minimize the loss, as an indication of the final performance of the model. In particular, the errors on the training set and on the validation set are monitored during the training process to understand the following issues:

If the network is learning at all—in this case, the training set error should decrease, otherwise we are in the regime of underfitting.

If the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set, but performs poorly on a set not used for tuning its parameters.

Lately, neural networks have been used for compressing and de-compressing media data, such as video/images. The most widely used architecture for such task is the auto-encoder, which is a neural network consisting of two parts: a neural encoder and a neural decoder. The encoder inputs media content, such as an image, and produces a code which requires less bits than the input media content. The code may be obtained by a binarization or quantization process after the encoder. The decoder inputs the code and reconstructs the media content which was input to the encoder.

Such encoders and decoders are usually trained to minimize a combination of bitrate and distortion, where the distortion is usually measured by Mean Squared Error (MSE), Peak Signal-to-Noise Ratio (PSNR), Structural Similarity (SSIM) index, or similar. These distortion metrics are meant to be inversely proportional to the human visual perception quality.

Reducing the distortion in video/image compression is often intended to increase human perceptual quality. After all, we consider humans as the end users, i.e. in this case of human users watching the decoded image. Recently, with the advent of machine learning, especially deep learning, there is a rising number of machines (i.e., autonomous agents) that analyze data independently from humans and that may even take decisions based on the analysis results without human intervention. Examples of such analysis include but are not limited to object detection, scene classification, semantic segmentation, video event detection, anomaly detection, and pedestrian tracking.

Thus, there may arise scenarios, where the video/image encoding could be tuned differently, depending on the scenario:

The decoded video/image bitstream is analyzed by machine(s). The analysis may comprise computationally-heavy processes such as larger and deeper neural networks. The task for the analysis can be but is not limited to any of those mentioned above.

A human observer may want to watch selected parts of the decoded video/image bitstream, e.g. on the basis of the analysis results. For example, the analysis may result into alerts about anomalies or the presence of certain objects or events in the video, and the human observer may want to observe the alerted portions of the decoded video/image.

Accordingly, the fact that the decoded data is sometimes primarily analyzed by machines, promotes the idea that the video/image encoding process could be optimized using a different distortion metric, i.e. other than conventionally used metrics aiming at minimizing the human-observed video/image quality degradation.

An enhanced method for learning neural networks is introduced herein.

Figure 4A:
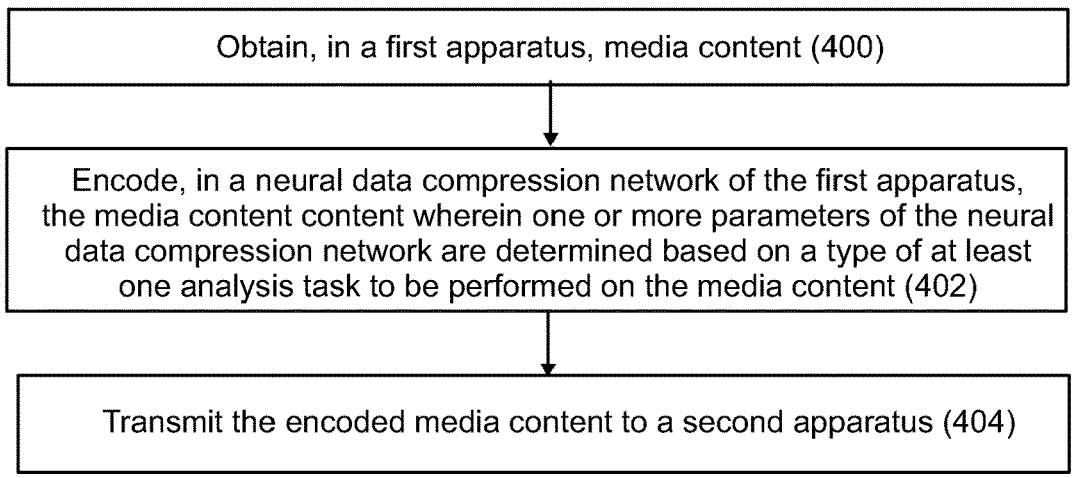
FIGS. 4a and 4b show flow charts of methods for running a neural network according to an embodiment of the invention.

An example of a method, which is depicted in the flow chart of FIG. 4a, comprises obtaining (400), in a first apparatus, media content, encoding (402), in a neural data compression network of the first apparatus, the media content wherein one or more parameters of the neural data compression network are determined based on a type of at least one analysis task to be performed on the media content; and transmitting (404) the encoded media content to a second apparatus.

Figure 4B:
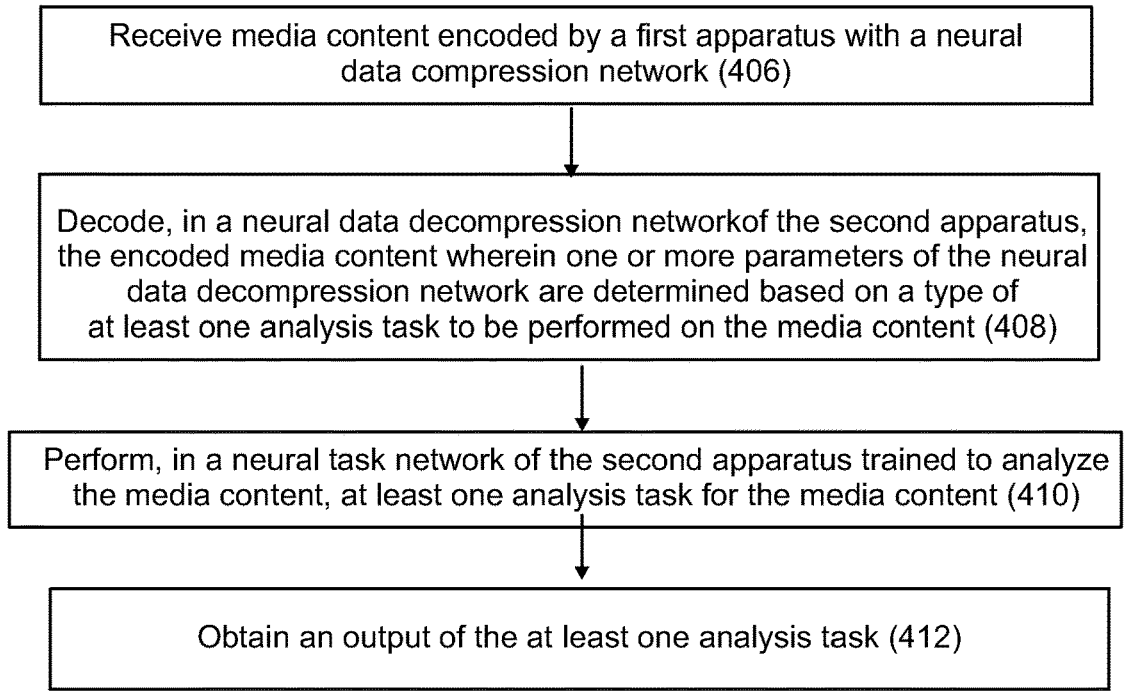

Another aspect of the method is the operation of the second apparatus, which is depicted in the flow chart of FIG. 4b. The method comprises receiving (406) media content encoded by a second apparatus with a neural data compression network; decoding (408), in a neural data decompression network of the second apparatus, the encoded media content wherein one or more parameters of the neural data decompression network are determined based on a type of at least one analysis task to be performed on the media content; performing (410), in a neural task network of the second apparatus trained to analyze the media content, at least one analysis task for the media content; and obtaining (412) an output of the at least one analysis task.

According to an embodiment, the method further comprises indicating, by the first apparatus, the at least one analysis task to be performed by the neural task network of the second apparatus.

Thus, the method addresses the problem of different distortion metrics by implementing a neural task network in a second apparatus, which neural task network may be trained to perform one or more analysis task on the media content, wherein different distortion metrics may be used. The first apparatus may be a resource-limited device, wherein sending the encoded media content and indicating the at least one analysis task to be performed, the second apparatus may utilize the specifically trained neural task network for carrying out the analysis.

According to an embodiment, the method further comprises requesting, by the first apparatus, the results of the at least one analysis task performed by the neural task network of the second apparatus to be sent back to the first apparatus.

Thus, the first apparatus may utilize the neural task network of the second apparatus to carry out a desired analysis for the media content and the first apparatus may request the results of the at least one analysis task to be sent back to be utilized by the first apparatus. On the other hand, the second apparatus may also utilize the results of the at least one analysis task, or it may send the results to a further apparatus.

The terms encoder and decoder, as used herein, refer to the neural encoder (a.k.a. neural data compression network) and the neural decoder (a.k.a. neural data decompression network) of an auto-encoder as described above. However, the method and the embodiments related thereto are not limited to auto-encoder type of neural network architecture, but they can be implemented in any other architecture which comprises an encoder part and a decoder part. The term (neural) task network refers to a neural network learned to optimize a specific task relating to the media content.

Figure 5:
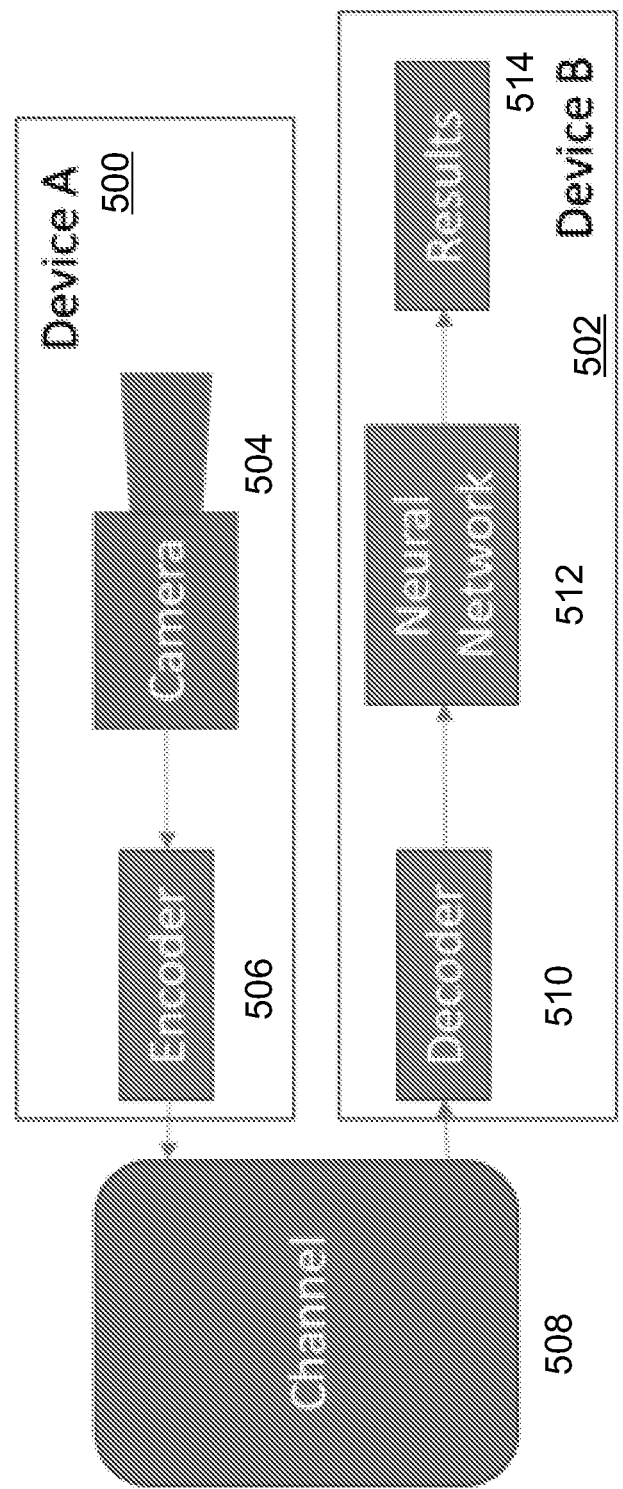
FIG. 5 shows a simplified example of a setup for implementing the embodiments of the invention.

FIG. 5 illustrates a simplified example of a setup for implementing the method and the embodiments related thereto. The system comprises at least two devices: a first apparatus A 500, which may be a resource-limited device constrained in terms of memory, bandwidth and/or computation capacity, and a second apparatus B 502, which preferably has no substantial memory, bandwidth, battery or computation limitations. The first apparatus A obtains or captures media content, for example using a camera 504, and compresses the media content using an appropriate neural encoder 506. The encoded media content is transmitted to the second apparatus B over a communication channel 508. The second apparatus B uses an appropriate neural decoder 510 to decode the encoded media content and processes the decoded media content with a task network 512 by performing one or more machine learning tasks. The results 514 of the one or more machine learning tasks, i.e. the output of the task network, may be utilized by the second apparatus B or, if required, sent back to the first apparatus A or to yet another apparatus.

The task network's results may be needed in the first apparatus A for certain tasks, such as guiding the camera to capture/zoom to certain objects such as people, changing the camera's capture parameters (exposure, etc.), re-orient microphones' receptive field (beamforming) for adapting the spatial selectivity. The results may also be useful in the second apparatus B that extracts information about the scenes captured in other devices, including the first apparatus A. In this case, the first apparatus A sends the captured content to the second apparatus B, whereupon the second apparatus B runs the tasks that require heavy networks and either uses the results for its own purposes or sends the results back to the first apparatus A or to other devices.

It is noted that the above limitations of device capabilities are described only to emphasize the advantages obtained by the embodiments in certain device setups. However, there may be other reasons why it is not preferable that the first apparatus A would run the neural network of interest. For example, the first apparatus A may experience bandwidth limitations so that it is not possible to transmit the heavy network to the device. Moreover, the second apparatus B may be able to update the neural network more often than the first apparatus A, thus being able to obtain better results with time. Therefore, the embodiments as described herein are equally applicable in devices having no such limitations.

The first apparatus A preferably sends a compressed version of the original content over the communication channel, which may be considered as bandwidth-limited. The classical encoder/decoder architectures are mostly designed in order to ensure a high perceptual quality, since it is often assumed that the content is for human perception. However, in the embodiments described herein it is possible that the compressed data is not intended for human perception, but rather for machine tasks. Running a neural network, which was trained on non-compressed images, may result in poorer results when input is reconstructed from compressed images. Also, encoding using an encoder optimized for human perception may result in bitrate which may be too high for what is actually needed for performing the desired task by the neural network (resulting in redundant bits).

Therefore, learning the system is an optimization process involving three neural networks, i.e. the encoder and the decoder of the auto-encoder and the desired task network, although the task network may not be optimized or modified. The encoder and decoder are preferably designed or trained in such a way that the task network in the second apparatus B will have high accuracy in the related task. The optimization may be carried out according to various embodiments described below.

The following table includes some examples of tasks, which may be learned to the task network, and which may influence to the design of the neural encoder and the neural decoder.

| | Error metric | Loss for training |
| --- | --- | --- |
| Object Detection | Prediction Accuracy and/or Intersection over Union | Mean Squared Error (MSE) |

-continued

| | Error metric | Loss for training |
| --- | --- | --- |
| Semantic Segmentation | Prediction Accuracy | Cross-entropy |
| Saliency Estimation (Eye-gaze prediction) | Area under the receiver operating characteristics curve | Cross-entropy or MSE |
| Salient Object Detection | F-measure and/or Mean absolute error | MSE |
| Scene Recognition | Prediction Accuracy | Cross-entropy |
| Object Recognition | Prediction Accuracy | Cross-entropy |
| Human perception | PSNR, MSE, SSIM, MS-SSIM, subjective evaluation | MSE, SSIM, MS-SSIM |

The table also discloses some examples of task-specific error metrics for determining the distortion, and metrics to be used for the loss value to be minimized. A task may be therefore associated with one or more error metrics and/or one or more types of loss function. Information about error metrics or type of loss functions may be exchanged between encoder 508 and decoder 510. Encoder 506 and/or decoder 510 may be optimized for a particular task based on the error metric and/or type of loss associated with the particular task.

According to an embodiment, the task network is learnt offline prior to deploying the encoder and decoder to the first apparatus A and the second apparatus B. The offline learning may involve maximizing the accuracy of the related task and minimizing the bit-rate.

Hence, prior to deployment of the encoder, decoder and task network to devices, an end-to-end system that includes the combination of the encoder-decoder-task network is learned. The system may be optimized via modifying the encoder's and decoder's parameters in order to increase the accuracy of the task network and minimize the bit rate of encoder's output. The optimization may be based on minimizing a weighted sum of one or more distortion metrics of the output of the task network and a bit rate value of the encoded signal, where a distortion metric may essentially be an inverse of an accuracy metric. Herein, a task network that is already pre-trained may be used, whereupon the weights of the task network are not updated during training, but it is simply used as a proxy to obtain a loss. The obtained loss is then differentiated with respect to the learnable parameters of the encoder and decoder through backpropagation or another suitable method.

According to an embodiment, the task network is fine-tuned, i.e., further trained from the pre-trained model, by differentiating the loss with respect to the weights of the task network.

According to an embodiment, the neural encoder and/or neural decoder is fine-tuned. The encoder neural network may be fine-tuned based on a training signal that is generated from the results/output transmitted back to the first apparatus A. The obtained gradients are then used for updating the parameters of the networks using for example stochastic gradient descent, Adam, RMSprop or any other suitable optimization routine.

Figure 6:
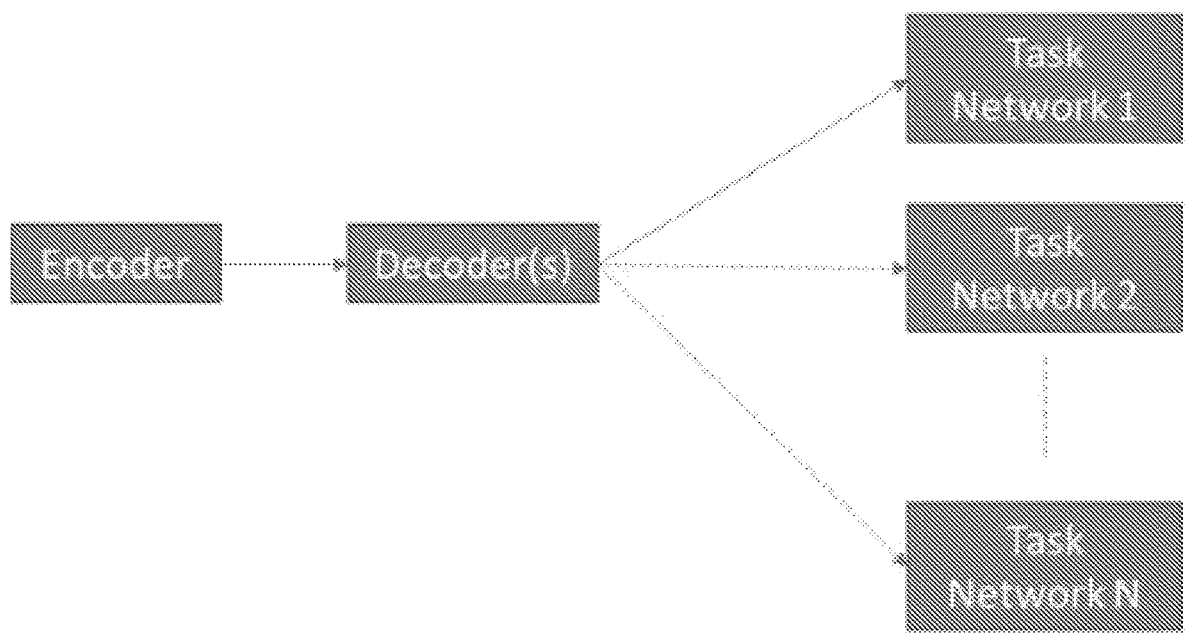
FIG. 6 shows a schematic diagram of offline training according to an embodiment of the invention.

According to an embodiment, the neural encoder and/or neural decoder is learned in respect of a plurality of task networks. An example of such embodiment is illustrated in FIG. 6. Thus, the offline training may be performed such that the second apparatus B may implement several task networks, wherein the same encoder and decoder would be trained to encode media content such that it provides good performance at several tasks when decoded. Herein, multiple losses during training, i.e. a linear combination of losses from each task, could be used.

According to an embodiment, separate encoder-decoder pairs are trained using different task networks to obtain the loss.

Also, these two alternative implementations may be combined, so that some encoder-decoder pairs are trained using multiple task networks, and some others are trained using individual task networks.

According to an embodiment, the offline training may be performed for one type of encoder and a plurality of decoders. This is also disclosed in FIG. 6. Each decoder may be trained in a way to perform optimally in a certain task.

Indications/Metadata

In addition to the encoded media content, i.e. the output of the neural encoder, the first apparatus A may send various indications and/or signaling to the second apparatus B specifying the task and/or operations related thereto.

According to an embodiment, the first apparatus A informs the second apparatus B about the type of the task to be performed on the decoded media content. Thus, the first apparatus A may indicate in and/or along the bitstream and/or signal to the second apparatus B information about the type of the task (Task-ID) for which the media compression was optimized.

The Task ID may be any identifier, such as a Uniform Resource Identifier (URI), a UUID, or a registered identifier value (e.g. maintained by a registration authority). The Task ID may identify a neural network topology of the encoder. The Task ID may be used to determine some or all of the hyper-parameters and/or weights for the neural network. Determining the parameters may comprise selecting one or more or a group of parameters from a set of pre-trained parameters. The set of pre-trained parameters may include parameters, e.g. weights, for different types of analysis tasks. The Task ID or alike may be further characterized by additional metadata, such as version and/or certain indicated or pre-defined hyper-parameters and/or weights of the neural network.

According to an embodiment, the first apparatus A may first request the second apparatus B about what are the task networks available in the second apparatus B. Then, the first apparatus A may encode the data with an encoder or using encoder settings optimized for one of the task networks (if available).

An example of the signaling from the first apparatus A to the second apparatus B can be as follows:

At time $t=(0,T_0)$: The first apparatus A captures the content, encodes it, and sends the following types of information to the second apparatus B via the communication channel.
  a. The encoder model type (ResNet50, DenseNet, VGG16, etc.)
  b. The task or tasks the encoder was trained on (object detection, semantic segmentation, etc.)
  c. An indication whether the results of the task(s) needed to be sent back to the first apparatus A, and if yes, what task results should be sent back
  d. The encoder output Examples of tasks results that may be sent back to the first apparatus A may include but are not limited to:
  For object detection: bounding box coordinates and associated object class index or string, for each detected object.
  For classification: index or string of main object/scene in image.
  For semantic segmentation: dense pixel-wise labels (1 label per pixel).

The pieces of information a, b, c may be coded with a binary vector. For example, for Information a, a code of a length may be used where $2^{\wedge}(bit\_length)$ is the number of the network types. For example, if there are 4 network types, 01 may mean ResNet50. Similar signaling may be applied for any of the information types a-c. The rest of the bits can be allocated for the encoder output. These bits can, for example, be the bit sequence generated by an entropy encoder.

Time span $t=(T_0,T_1)$ may be considered as the time passing while sending the information via the communication channel.

At time $t=(T_1,T_2)$: The second apparatus B receives the signalling and runs the decoder and one or more task networks indicated by the signalling. Alternatively, if the signalling indicates that the data has been encoded for human perception, for example by a particular task identifier, the second apparatus B may not process the data by the task network. instead, the second apparatus may for example render the decoded content on a display. In some embodiments, the second apparatus B may send the results from the task network(s) back to the first apparatus A, if requested or as a default.

The signalling may include e.g. a code of length where $2^{\wedge}(bit\_length)$ is the number of possible tasks and the pre-requested task of object detection can be coded, for example, as 01. The signalling may further include the number of bits reserved for the results of the pre-requested task, such as the object detection. The results may be sent with the code-length of indicated bits. In short, the code may be illustrated as follows: a-b-c where a=binary vector of task indicator, b=bit length of c, c=the results. If there are multiple tasks, then a-b-c codes can be concatenated.

Upon inference, the media content is captured in the first apparatus A. The neural encoder compresses the media content and sends the codes to the second apparatus B via the communication channel. The first apparatus A further sends other information about:
  1) the tasks that the encoder was trained for
  2) the pretrained task network type/model (such as VGG16, Densenet, Resnet, etc) and weights checkpoint (i.e., version of the weights' values).

Herein, a signaling may be used, where e.g. first N bits can be reserved for the IDs of the tasks and next M bits can be reserved for the neural network types that are used.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
    obtaining, in a first apparatus, media content;
    encoding, in a neural data compression network of the first apparatus, the media content, wherein one or more parameters of the neural data compression network are determined based on a type of at least one analysis task to be performed on reconstructed media content with a second apparatus, wherein the reconstructed media content comprises a reconstruction of the encoded media content, and wherein the type of the at least one analysis task to be performed on the reconstructed media content with the second apparatus is one of: object detection, scene classification, semantic segmentation, video event detection, anomaly detection, pedestrian tracking; and
    transmitting the encoded media content to the second apparatus.

2. The method of claim 1, wherein the one or more parameters of the neural data compression network are determined based on a metric used to determine accuracy of the at least one analysis task, and a criterion used to train a neural task network for the at least one analysis task.

3. The method of claim 1 further comprising:
    indicating, with the first apparatus, that the at least one analysis task is to be performed with a neural task network of the second apparatus; or
    requesting, with the first apparatus, the output of the at least one analysis task to be sent back to the first apparatus.

4. The method of claim 1 further comprising:
    receiving, from the second apparatus, a training signal generated from a result of the at least one analysis task; and
    fine-tuning the neural data compression network, based on the training signal received from the second apparatus.

5. The method of claim 1 further comprising:
    learning the neural data compression network with respect to a plurality of neural task networks, including a neural task network used to perform the at least one analysis task, for a plurality of respective different analysis tasks including the at least one analysis task.

6. A method comprising:
    receiving media content encoded with a second apparatus with a neural data compression network;
    decoding, in a neural data decompression network of a first apparatus, the encoded media content to generate reconstructed media content, wherein one or more parameters of the neural data decompression network are determined based on a type of at least one analysis task to be performed on the reconstructed media content with the first apparatus, and wherein the type of the at least one analysis task to be performed on the reconstructed media content with the first apparatus is one of: object detection, scene classification, semantic segmentation, video event detection, anomaly detection, pedestrian tracking;
    performing, in a neural task network of the first apparatus trained to analyze the reconstructed media content, the at least one analysis task for the reconstructed media content; and
    obtaining an output of the at least one analysis task.

7. The method of claim 6 further comprising:
    learning the neural task network offline, prior to deployment of the neural data compression network and the neural data decompression network.

8. The method of claim 7, wherein the offline learning comprises:
    maximizing an accuracy of a related task and minimizing a bitrate of the encoded media content.

9. The method of claim 6 further comprising:
    fine-tuning the neural task network from a pre-trained model with differentiating a loss with respect to weights of the neural task network.

10. The method of claim 6 further comprising:
    fine-tuning the neural data decompression network, based on a training signal generated from a result of the at least one analysis task.

11. The method of claim 6 further comprising:
    learning the neural data decompression network with respect to a plurality of neural task networks, including the neural task network, for a plurality of respective different analysis tasks including the at least one analysis task.

12. An apparatus comprising:
at least one processor; and
at least one non-transitory memory storing instructions that, when executed by the at least one processor, cause the apparatus at least to:
obtain media content;
encode, in a neural data compression network of the apparatus, the media content, wherein one or more parameters of the neural data compression network are determined based on a type of at least one analysis task to be performed on reconstructed media content with a second apparatus, wherein the reconstructed media content comprises a reconstruction of the encoded media content, and wherein the type of the at least one analysis task to be performed on the reconstructed media content with the second apparatus is one of: object detection, scene classification, semantic segmentation, video event detection, anomaly detection, pedestrian tracking; and
transmit the encoded media content to the second apparatus.

13. The apparatus of claim 12, wherein the apparatus is further caused to:
receive an output of the at least one analysis task performed with the second apparatus on decoded media content, the decoded media content comprising the reconstructed media content.

14. The apparatus of claim 12, wherein the apparatus is further caused to:
transmit an indication of the type of the at least one analysis task to the second apparatus.

15. The apparatus of claim 12, wherein the apparatus is further caused to:
receive, from the second apparatus, a training signal generated from a result of the at least one analysis task; and
fine-tune the neural data compression network, based on the training signal received from the second apparatus.

16. An apparatus comprising:
at least one processor; and
at least one non-transitory memory storing instructions that, when executed by the at least one processor, cause the apparatus at least to:
receive media content encoded with a second apparatus with a neural data compression network;
decode, in a neural data decompression network of a first apparatus, the encoded media content to generate reconstructed media content, wherein one or more parameters of the neural data decompression network are determined based on a type of at least one analysis task to be performed on the reconstructed media content with the first apparatus, and wherein the type of the at least one analysis task to be performed on the reconstructed media content with the first apparatus is one of: object detection, scene classification, semantic segmentation, video event detection, anomaly detection, pedestrian tracking;
perform, in a neural task network of the first apparatus trained to analyze the reconstructed media content, the at least one analysis task for the reconstructed media content; and
obtain an output of the at least one analysis task.

17. The apparatus of claim 16, wherein the apparatus is further caused to:
learn the neural task network offline prior to deploying the neural data compression network and the neural data decompression network.

18. The apparatus of claim 17, wherein to learn the neural task network offline, the apparatus is caused to:
maximize an accuracy of a related task and minimize a bitrate of the encoded media content.

19. The apparatus of claim 17, wherein the apparatus is further caused to:
fine-tune the neural task network from a pre-trained model with differentiating a loss with respect to weights of the neural task network.

20. The apparatus of claim 16, wherein the one or more parameters for the neural data decompression network are determined based on an indication of a type of the at least one analysis task received from the second apparatus.

21. The method of claim 1, further comprising:
receiving, from the second apparatus, a result of the at least one analysis task; and
adjusting a device used for the obtaining of the media content, based on the result of the at least one analysis task received from the second apparatus.

22. The method of claim 1, wherein the one or more parameters of the neural data compression network comprise a training parameter of the neural data compression network.

23. The method of claim 1, wherein the one or more parameters of the neural data compression network are determined based on a weighted combination of a metric used to determine accuracy of the at least one analysis task, and a bit rate value of the transmitted encoded media content.

24. The method of claim 5, wherein the different analysis tasks comprise respectively different error metrics and respectively different training criteria.

25. A non-transitory computer-readable medium comprising program instructions stored thereon which are configured to, when executed with at least one processor, cause the at least one processor to perform the method of claim 1.

26. A non-transitory computer-readable medium comprising program instructions stored thereon which are configured to, when executed with at least one processor, cause the at least one processor to perform the method of claim 6.

27. The method of claim 1, wherein the at least one analysis task to be performed on the reconstructed media content is performed with a neural task network trained to analyze the reconstructed media content.

28. The method of claim 12, wherein the at least one analysis task to be performed on the reconstructed media content is performed with a neural task network trained to analyze the reconstructed media content.

* * * * *